United States Patent
Horii et al.

(10) Patent No.: US 9,991,754 B2
(45) Date of Patent: Jun. 5, 2018

(54) EMBEDDED PERMANENT MAGNET ROTARY ELECTRIC MACHINE

(71) Applicant: MITSUBISHI ELECTRIC CORPORATION, Tokyo (JP)

(72) Inventors: Masaki Horii, Tokyo (JP); Masaya Inoue, Tokyo (JP); Yoshiaki Kitta, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 215 days.

(21) Appl. No.: 14/899,604

(22) PCT Filed: Aug. 5, 2013

(86) PCT No.: PCT/JP2013/071158
§ 371 (c)(1),
(2) Date: Dec. 18, 2015

(87) PCT Pub. No.: WO2015/019402
PCT Pub. Date: Feb. 12, 2015

(65) Prior Publication Data
US 2016/0149450 A1    May 26, 2016

(51) Int. Cl.
*H02K 1/30*    (2006.01)
*H02K 1/32*    (2006.01)
(Continued)

(52) U.S. Cl.
CPC ............ *H02K 1/32* (2013.01); *H02K 1/16* (2013.01); *H02K 1/2766* (2013.01); *H02K 1/30* (2013.01); *H02K 9/19* (2013.01); *H02K 11/25* (2016.01)

(58) Field of Classification Search
CPC .. H02K 1/32; H02K 1/16; H02K 1/27; H02K 1/30; H02K 11/25; H02K 9/19; H02K 1/2766
(Continued)

(56) References Cited

U.S. PATENT DOCUMENTS 7,550,889 B2 *  6/2009  Horst .................. H02K 1/2766
                                                          310/156.38
7,701,100 B2 *  4/2010  Morel ..................... H02K 1/278
                                                          310/156.19
(Continued)

FOREIGN PATENT DOCUMENTS

EP         2 562 914 A1      2/2013
JP         2001-37129 A      2/2001
(Continued)

OTHER PUBLICATIONS

JPO machine translation of JP 2008178243, all pages.*
(Continued)

*Primary Examiner* — Naishadh Desai
(74) *Attorney, Agent, or Firm* — Sughrue Mion, PLLC; Richard C. Turner

(57) ABSTRACT

A permanent magnet 21 is housed in a magnet housing aperture 20, an adhesive is disposed only between an outside wall surface 20*a* that is positioned on a radially outer side of an inner wall surface of the magnet housing aperture 20 and an outside surface 21*a* that is positioned on a radially outer side of a surface of the permanent magnet 21 such that the permanent magnet 21 is fixed so as to be closer to the outside wall surface 20*a*, and a cooling flow channel 23 through which a coolant is made to flow is formed by an inside surface 21*b* that is positioned on a radially inner side of the surface of the permanent magnet 21 and an inside wall
(Continued)

surface 20b that is positioned on a radially inner side of the inner wall surface of the magnet housing aperture 20.

6 Claims, 9 Drawing Sheets

(51) Int. Cl.
    *H02K 9/19*          (2006.01)
    *H02K 1/27*          (2006.01)
    *H02K 1/16*          (2006.01)
    *H02K 11/25*        (2016.01)

(58) Field of Classification Search
USPC .................................. 310/156.53, 156.56, 54
See application file for complete search history.

(56) References Cited

U.S. PATENT DOCUMENTS

| | | | | |
|---|---|---|---|---|
| 8,928,195 B2 * | 1/2015 | Ohashi | ...................... | H02K 1/32 310/54 |
| 2004/0135441 A1 * | 7/2004 | Groening | ................. | H02K 1/20 310/58 |
| 2007/0052313 A1 * | 3/2007 | Takahashi | ............ | H02K 1/2766 310/156.53 |
| 2011/0163624 A1 * | 7/2011 | Hori | ....................... | H02K 1/276 310/156.53 |

FOREIGN PATENT DOCUMENTS

| | | | |
|---|---|---|---|
| JP | 2002-345188 A | | 11/2002 |
| JP | 2005-245085 A | | 9/2005 |
| JP | 2008-178243 A | | 7/2008 |
| JP | 2008178243 A | * | 7/2008 |
| JP | 2009-303293 A | | 12/2009 |
| JP | 5097743 B2 | | 12/2012 |
| JP | 2013-13182 A | | 1/2013 |
| JP | 2013-17297 A | | 1/2013 |
| JP | 2013-21811 A | | 1/2013 |
| JP | 2013013182 A | * | 1/2013 |
| JP | 2013021811 A | * | 1/2013 |

OTHER PUBLICATIONS

JPO machine translation of JP JP2013013182, all pages.*
JPO machine translation of JP JP2013021811, all pages.*
Communication dated Mar. 24, 2017 from the European Patent Office in counterpart Application No. 13891003.9.
International Search Report of PCT/JP2013/071158, dated Sep. 10, 2013. [PCT/ISA/210].
Written Opinion of PCT/JP2013/071158, dated Sep. 10, 2013. [PCT/ISA/237].

* cited by examiner

EMBEDDED PERMANENT MAGNET ROTARY ELECTRIC MACHINE

CROSS REFERENCE TO RELATED APPLICATIONS

This application is a National Stage of International Application No. PCT/JP2013/071158 filed Aug. 5, 2013, the contents of all of which are incorporated herein by reference in their entirety.

TECHNICAL FIELD

The present invention relates to an embedded permanent magnet rotary electric machine in which permanent magnets are embedded in an outer circumferential side of a rotor core, and particularly relates to a cooling construction for the permanent magnets that are embedded in the rotor core.

BACKGROUND ART

In conventional embedded permanent magnet rotary electric machines, permanent magnets have been disposed inside cavities that are formed in a rotor core so as to extend in a direction of a rotational axis, insulating members have been formed so as to completely cover inner wall surfaces of the cavities, and the permanent magnets have been cooled by passing a liquid coolant through cooling flow channels that are formed by inner surfaces of the insulating members and surfaces of the permanent magnets (see Patent Literature 1, for example).

In other conventional embedded permanent magnet rotary electric machines, rotors have been constituted by an annular outer yoke portion in which permanent magnets are embedded, an annular inner yoke portion that is disposed inside the outer yoke portion, and ribs that connect together inner circumferential surfaces of the outer yoke portion and outer circumferential surfaces of the inner yoke portion, and groove portions have been formed on inner circumferential surfaces of the outer yoke portion so as to extend from a first axial end portion to a second axial end portion. The permanent magnets have been cooled by directing cooling oil that is supplied to penetrating apertures that are formed by the inner circumferential surfaces of the outer yoke portion, outer circumferential surfaces of the inner yoke portion, and the ribs into the groove portions due to centrifugal forces so as to be guided by the groove portions to flow smoothly (see Patent Literature 2, for example).

CITATION LIST

Patent Literature

Patent Literature 1: Japanese Patent Laid-Open No. 2013-17297 (Gazette)
Patent Literature 2: Japanese Patent No. 5097743 (Gazette)

SUMMARY OF THE INVENTION

Problem to be Solved by the Invention

However, in the conventional embedded permanent magnet rotary electric machine that is described in Patent Literature 1, because the insulating members are formed so as to completely cover the inner wall surfaces of the cavities, the cross-sectional shapes of the cavities are increased in proportion to the spaces in which the insulating members are formed. Thus, one problem has been that distances between the permanent magnets and the inner wall surfaces of the cavities are increased, increasing magnetic resistance between the permanent magnets and the rotor core, and leading to reductions in the amount of magnetic flux from the permanent magnets.

In the conventional embedded permanent magnet rotary electric machine that is described in Patent Literature 2, because the flow channels for the cooling oil are formed between the outer yoke portion and the inner yoke portion, the heat from the permanent magnets is radiated to the cooling oil by means of the outer yoke portion, and one problem has been that the permanent magnets cannot be cooled effectively.

The present invention aims to solve the above problems and an object of the present invention is to provide an embedded permanent magnet rotary electric machine that suppresses reductions in magnetic flux from permanent magnets by reducing usage of adhesive that fixes the permanent magnets to inner wall surface of magnet housing apertures, reducing cross-sectional area of the magnet housing apertures, and shortening distances between inner wall surfaces of the magnet housing apertures and the permanent magnets, and that can also cool permanent magnets effectively by configuring cooling flow channels such that a coolant cools the permanent magnets directly.

Means for Solving the Problem

An embedded permanent magnet rotary electric machine according to the present invention includes: a stator including: an annular stator core; and a stator coil that is wound onto the stator core; and a rotor including: a rotor core that is configured by laminating and integrating electromagnetic steel sheets, and that is fixed to a shaft so as to be disposed rotatably inside the stator core; a plurality of permanent magnet housing apertures that are disposed circumferentially so as to be respectively formed so as to pass axially through an outer circumferential side of the rotor core; and permanent magnets that are housed in each of the magnet housing apertures. An adhesive is disposed only between an outside wall surface that is positioned on a radially outer side of an inner wall surface of the magnet housing apertures and an outside surface that is positioned on a radially outer surface of the permanent magnets such that the permanent magnets are fixed so as to be closer to the outside wall surface of the magnet housing apertures, and cooling flow channels through which a coolant flows are formed by an inside surface that is positioned on a radially inner side of a surface of the permanent magnets and inside wall surfaces that are positioned on a radially inner side of inner wall surfaces of the magnet housing apertures.

Effects of the Invention

According to the present invention, the permanent magnets are fixed so as to be closer to an outside wall surface that is positioned on a radially outer side of the magnet housing apertures, and cooling flow channels through which a coolant flows are formed by an inside surface that is positioned on a radially inner side of a surface of the permanent magnets and inside wall surfaces that are positioned on a radially inner side of inner wall surfaces of the magnet housing apertures. Thus, the cooling oil that flows through the cooling flow channels contacts the inside surfaces of the permanent magnets directly, enabling the permanent magnets to be cooled effectively.

Because the adhesive is disposed only between the outside wall surface that is positioned on the radially outer side of the inner wall surface of the magnet housing apertures and the outside surface that is positioned on the radially outer surface of the permanent magnets, the amount of adhesive is reduced, enabling the cross-sectional area of the magnet housing apertures to be reduced. Thus, distances between the permanent magnets and the inner wall surfaces of the magnet housing apertures are shortened, suppressing increases in magnetoresistance between the permanent magnets and the rotor core. Reductions in the amount of magnetic flux from the permanent magnets that result from increases in magnetoresistance can thereby be suppressed.

DESCRIPTION OF EMBODIMENTS

Preferred embodiments of an embedded permanent magnet rotary electric machine according to the present invention will now be explained with reference to the drawings.

Embodiment 1

Figure 1:
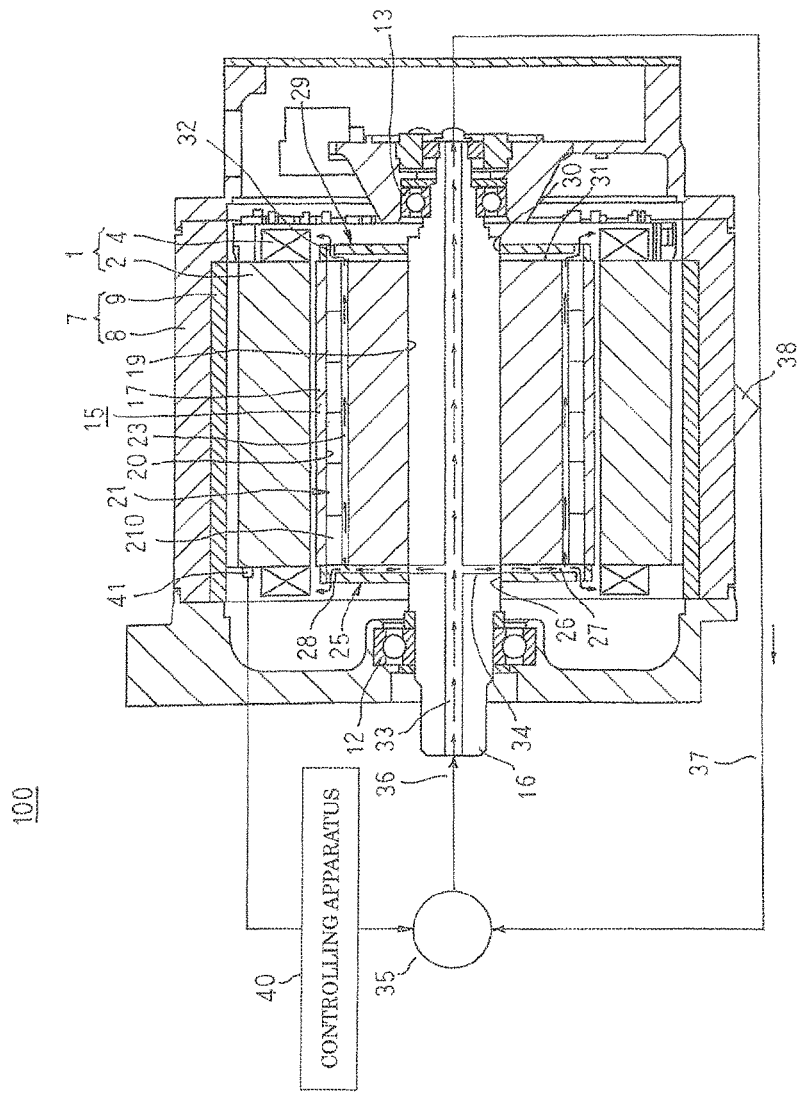
FIG. 1 is a cross section that shows an embedded permanent magnet rotary electric machine according to Embodiment 1 of the present invention.
Figure 2:
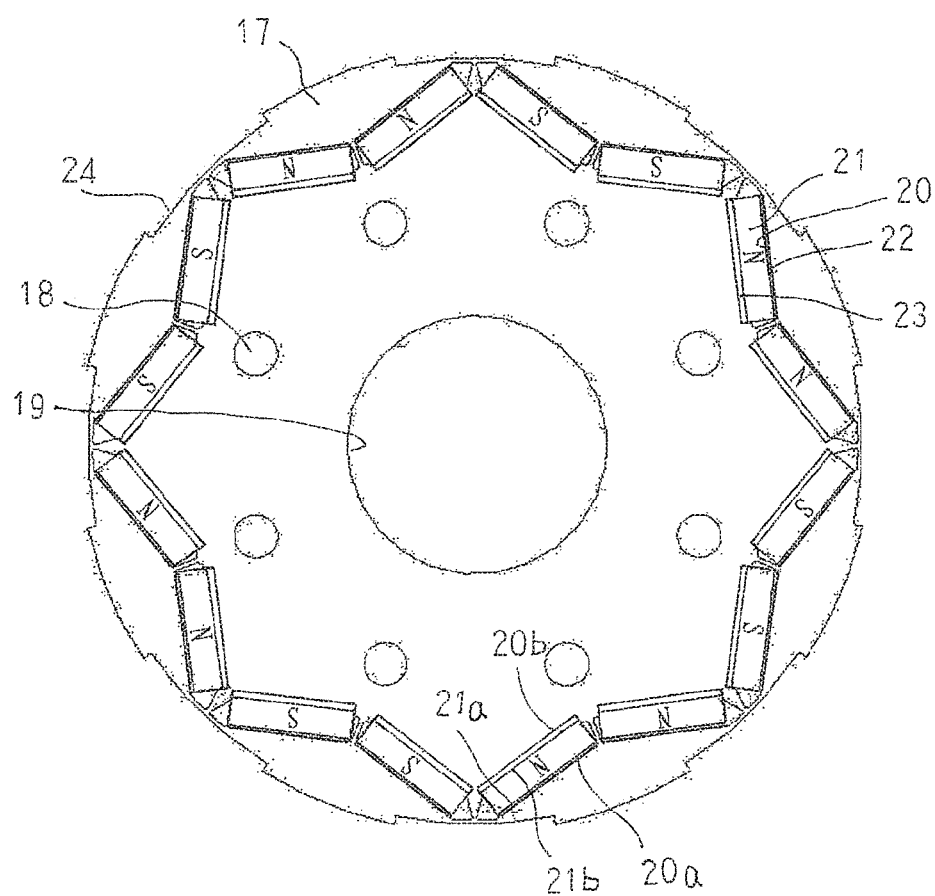
FIG. 2 is an end elevation that shows a rotor core in the embedded permanent magnet rotary electric machine according to Embodiment 1 of the present invention.
Figure 3:
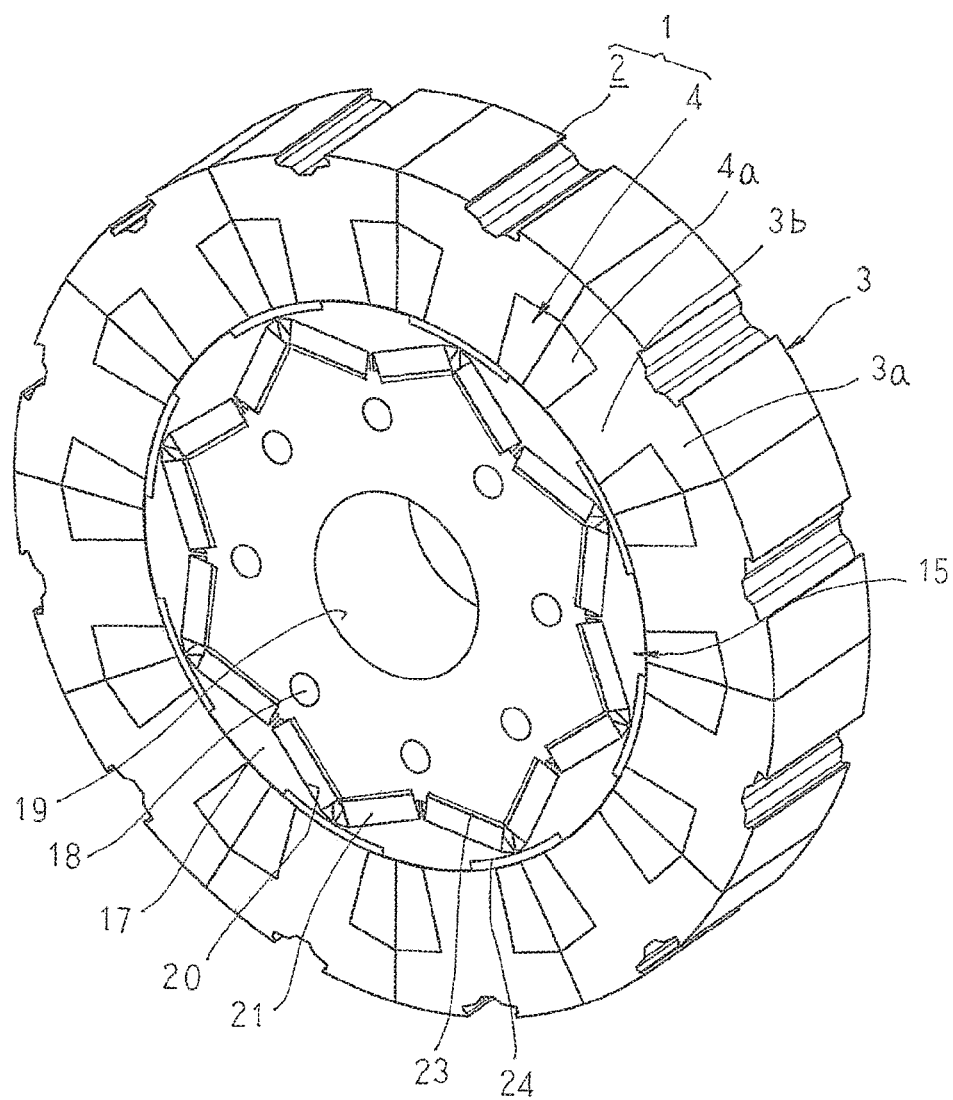
FIG. 3 is an oblique projection that explains a state in which the rotor core is installed in a stator in the embedded permanent magnet rotary electric machine according to Embodiment 1 of the present invention.
Figure 4:
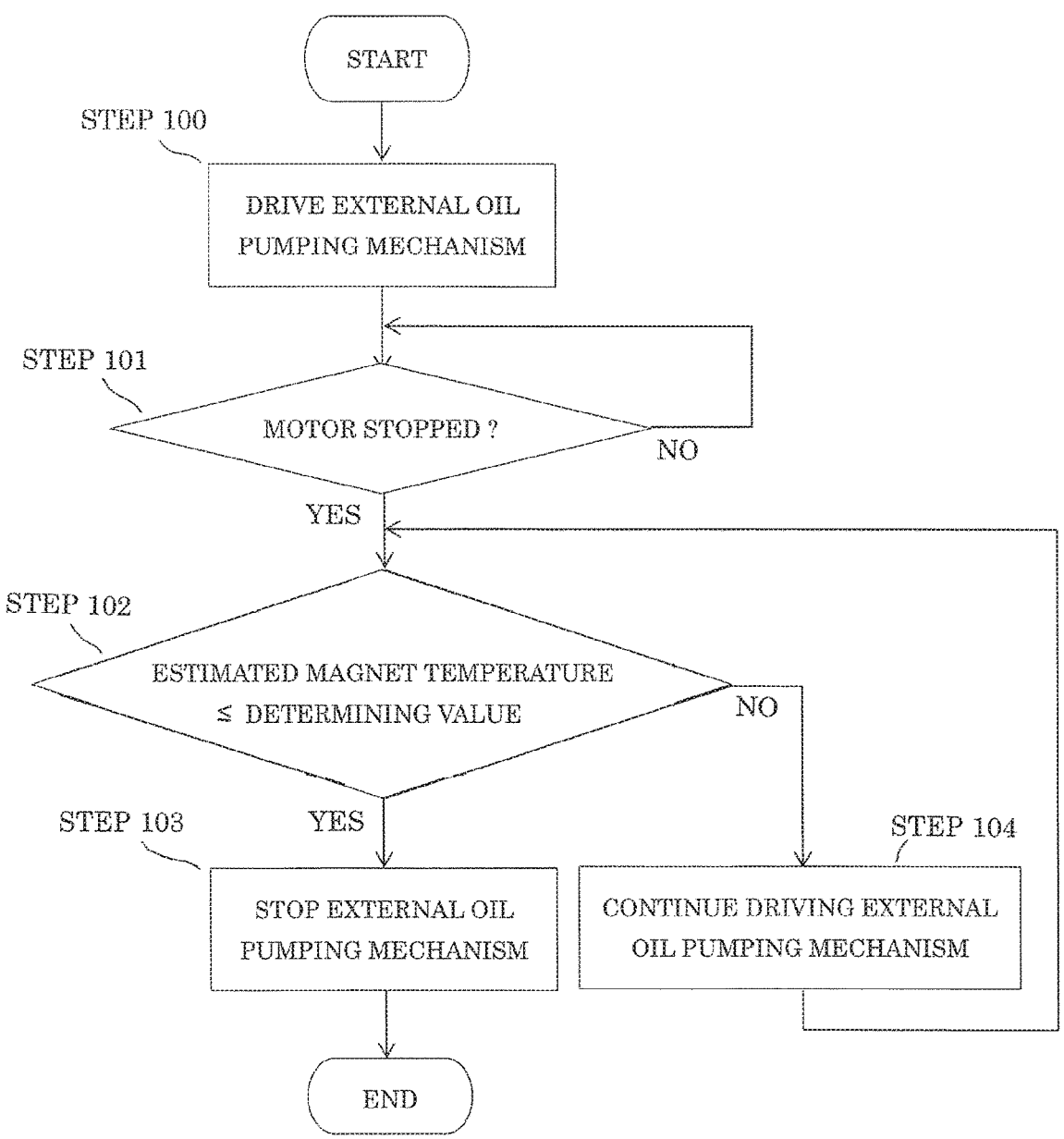
FIG. 4 is a flow diagram that shows a driving control method for external oil pumping equipment in the embedded permanent magnet rotary electric machine according to Embodiment 1 of the present invention.

FIG. 1 is a cross section that shows an embedded permanent magnet rotary electric machine according to Embodiment 1 of the present invention, FIG. 2 is an end elevation that shows a rotor core in the embedded permanent magnet rotary electric machine according to Embodiment 1 of the present invention, FIG. 3 is an oblique projection that explains a state in which the rotor core is installed in a stator in the embedded permanent magnet rotary electric machine according to Embodiment 1 of the present invention, and FIG. 4 is a flow diagram that shows a driving control method for external oil pumping equipment in the embedded permanent magnet rotary electric machine according to Embodiment 1 of the present invention. Moreover, the arrows in FIG. 1 represent cooling oil flow.

In FIGS. 1 through 3, an embedded permanent magnet rotary electric machine 100 includes: an annular stator 1; a cylindrical frame 7 inside which the stator 1 is housed and held; a front frame 10 and a rear frame 11 that respectively include bearings 12 and 13, that are disposed at two axial ends of the frame 7, and that together with the frame 7 form a sealed space; a rotor 15 that is rotatably disposed inside the stator 1 such that a shaft 16 is supported by the bearings 12 and 13; an external oil pumping mechanism 35; and a controlling apparatus 40 that controls driving of the external oil pumping mechanism 35.

The stator 1 has: an annular stator core 2; and a stator coil 4 that is mounted onto the stator core 2. Core blocks 3 have: a circular arc-shaped core back portion 3a; and a tooth 3b that protrudes radially outward from a circumferentially central position of an inner circumferential surface of the core back portion 3a. The stator core 2 is configured into an annular shape by arranging twelve core blocks 3 circumferentially by butting together circumferential side surfaces of the core back portions 3a. A concentrated winding coil 4a that is produced by winding a conductor wire a plurality of times is mounted onto the tooth 3b of each of the core blocks 3. The stator coil 4 is constituted by twelve concentrated winding coils 4a.

The frame 7 is formed by fitting together and integrating a cylindrical inner frame 9 that is made of aluminum inside a cylindrical outer frame 8 that is made of iron. The twelve core blocks 3 onto which the concentrated winding coils 4a have been mounted are arranged into an annular shape by butting together circumferential side surfaces of the core back portions 3a, and are pressed into and fixed inside the frame 7 to assemble the stator 1.

The rotor 15 includes: a cylindrical rotor core 17; the shaft 16, which is press-fitted into and fixed to a shaft insertion aperture 19 that is formed so as to pass through a central axial position of the rotor core 17; sixteen permanent magnets 21 that are each mounted so as to pass through an outer circumferential side of the rotor core 17; and a first end plate 29 and a second end plate 29 that are press-fitted onto and fixed to the shaft 16, and that are disposed so as to contact two axial end surfaces of the rotor core 17.

The rotor core 17 is produced by laminating and integrating annular core laminations that are punched from a thin electromagnetic steel sheet so as to be positioned by penetrating apertures 18, and has a shaft insertion aperture 19 that passes through a central position. Eight pairs of magnet housing apertures 20 are respectively formed at a uniform pitch in a circumferential direction so as to pass axially through an outer circumferential side of the rotor core 17 such that cross sections that are perpendicular to an axial direction of the shaft 16 have an approximately rectangular shape that is constant in the axial direction. The pairs of magnet housing apertures 20 are disposed in V shapes that open out toward a radially outer side.

Here, portions of inner wall surfaces of the magnet housing apertures 20 that are positioned on a radially outer side will be designated "outside wall surfaces 20a", and portions that are positioned on a radially inner side will be designated "inside wall surfaces 20b". In other words, the outside wall surfaces 20a are inner wall surfaces that are constituted by long sides that are on a radially outer side of the cross sections of the magnet housing apertures 20, and the inside wall surfaces 20b are inner wall surfaces that are constituted by long sides that are on a radially inner side of the cross sections. Longitudinal directions of the long sides of the cross sections of the magnet housing apertures 20 will be designated "width directions".

The permanent magnets 21 have cross sections perpendicular to an axial direction of the shaft 16 that are rectangular shapes, and are housed in the respective magnet housing apertures 20. Here, portions of surfaces of the permanent magnets 21 that are positioned on a radially outer side will be designated "outside surfaces 21a", and portions that are positioned on a radially inner side will be designated "inside surfaces 21b". In other words, the outside surfaces 21a are surfaces that are constituted by long sides that are on a radially outer side of the cross sections of the permanent magnets 21, and the inside surfaces 21b are surfaces that are constituted by long sides that are on a radially inner side of the cross sections. Longitudinal directions of the long sides of the cross sections of the permanent magnets 21 will be designated "width directions".

When housed in the magnet housing apertures 20, only the outside surfaces 21a of the permanent magnets 21 are fixed adhesively to the outside wall surfaces 20a of the magnet housing apertures 20 using an adhesive 22. The permanent magnets 21 are thereby positioned on a side near the outside wall surfaces 20a inside the magnet housing apertures 20 such that gaps are formed between the inside surfaces 21b of the permanent magnets 21 and the inside wall surfaces 20b of the magnet housing apertures 20. These gaps pass axially through the rotor core 17 to form cooling flow channels 23.

Pairs of the permanent magnets 21 that are housed in the pairs of magnet housing apertures 20 are magnetized so as to have identical magnetic poles. Eight pairs of the permanent magnets 21 are disposed such that different magnetic poles alternate circumferentially. In this case, the permanent magnets 21 are configured by arranging in a single row in the axial direction six magnet blocks 210 that are formed so as to have strip shapes that have cross sections perpendicular to an axial direction of the shaft 16 that are rectangular shapes.

In addition, eight rotor grooves 24 that have a groove direction in an axial direction are respectively formed on an outer circumferential surface of the rotor core 17 so as to have groove shapes that have an identical rectangular cross section so as to extend from a first axial end to a second end of the rotor core 17, and are arranged at a uniform angular pitch circumferentially. Circumferential centers of these rotor grooves 24 are positioned between adjacent magnetic poles.

The first end plate 25 is produced into a ring-shaped flat plate that has an outside diameter that is approximately equal to an outside diameter of the rotor core 17, and that has a shaft insertion aperture 26 at a central position. An inlet flow channel 27 is formed by hollowing out a first surface of the first end plate 25 to a constant depth so as to leave an outer circumferential edge portion thereof. Eight first discharging channels 28 are formed at a uniform pitch circumferentially so as to each pass axially through the first end plate 25 so as to communicate between an outer circumferential portion of the inlet flow channel 27 and a second surface side of the first end plate 25.

The shaft 16 is passed through the shaft insertion aperture 26, and the first end plate 25 is fixed by press-fitting onto the shaft 16 from a first axial end such that the first surface faces toward the rotor core 17. The first surface of the first end plate 25 contacts a first axial end surface of the rotor core 17 such that the opening of the inlet flow channel 27 is closed. The cooling flow channels 23 that are formed on the rotor core 17 are connected to the inlet flow channel 27. The first discharging channels 28 are positioned radially outside each of the cooling flow channels 23.

The second end plate 29 is produced into a ring-shaped flat plate that has an outside diameter that is approximately equal to an outside diameter of the rotor core 17, and that has a shaft insertion aperture 30 at a central position. An inlet flow channel 31 is formed by hollowing out a first surface of the second end plate 29 to a constant depth so as to leave an outer circumferential edge portion thereof. Eight second discharging channels 32 are formed at a uniform pitch circumferentially so as to each pass axially through the second end plate 29 so as to communicate between an outer circumferential portion of the inlet flow channel 31 and a second surface side of the second end plate 29. In this case, the second end plate 29 is formed so as to have an identical shape to the first end plate 25.

The shaft 16 is passed through the shaft insertion aperture 30, and the second end plate 29 is fixed by press-fitting onto the shaft 16 from a second axial end such that the first surface faces toward the rotor core 17. The first surface of the second end plate 29 contacts a second axial end surface of the rotor core 17 such that the opening of the inlet flow channel 31 is closed. The cooling flow channels 23 that are formed on the rotor core 17 are connected to the inlet flow channel 31. The second discharging channels 32 are positioned radially outside each of the cooling flow channels 23.

The shaft 16 includes: an in-shaft flow channel 33 that passes axially through a central position; and branching flow channels 34 that each branch off radially from the in-shaft flow channel 33, and that communicate between the in-shaft flow channel 33 and the inlet flow channel 27 that is formed on the first end plate 25.

Supply piping 36 connects a discharging orifice of an external oil pumping mechanism 35 that constitutes a coolant supplying means and an inlet of the in-shaft flow channel 33 of the shaft 16. Return piping 37 connects an oil pan 38 that is mounted below the frame 7 and an outlet of the in-shaft flow channel 33 of the shaft 16 with a suction orifice of the external oil pumping mechanism 35.

The controlling apparatus 40 controls the driving of the external oil pumping mechanism 35 based on a temperature detected by a temperature sensor 41 such as a thermistor that is disposed on the stator core 2.

An embedded permanent magnet rotary electric machine 100 that is configured in this manner operates as an eight-pole, twelve-slot inner-rotor synchronous motor when electricity is supplied to the stator coil 4 from an external electric power supply, for example.

When the external oil pumping mechanism 35 is driven, cooling oil is conveyed under pressure through the supply piping 36 to the in-shaft flow channel 33, and flows through the branching flow channels 34 into the inlet flow channel 27, as indicated by arrows in FIG. 1. The cooling oil that has flowed into the inlet flow channel 27 flows radially outward through the inlet flow channel 27, and flows into the cooling flow channels 23. The cooling oil that has flowed into the cooling flow channels 23 flows through the cooling flow channels 23 toward the second axial end, absorbing heat from the permanent magnets 21, and is discharged from the second discharging channels 32. The cooling oil that has been discharged from the second discharging channels 32 is scattered by centrifugal force, contacts the rear-end coil ends of the stator coil 4, absorbing heat from the stator coil 4, and is collected in the oil pan 38.

A portion of the cooling oil that has flowed radially outward through the inlet flow channel 27 is discharged from the first discharging channels 28. The cooling oil that has been discharged from the first discharging channels 28 is scattered by centrifugal force, contacts the front-end coil ends of the stator coil 4, absorbing heat from the stator coil 4, and is collected in the oil pan 38. The cooling oil that has been collected in the oil pan 38 is returned to the external oil pumping mechanism 35 through the return piping 37 together with cooling oil that is discharged from the outlet of the in-shaft flow channel 33 of the shaft 16.

According to Embodiment 1, the outside surfaces 21a of the permanent magnets 21 are fixed adhesively to the outside wall surfaces 20a of the magnet housing apertures 20, and the permanent magnets 21 are positioned on a side near the outside wall surfaces 20a inside the magnet housing apertures 20. Cooling flow channels 23 are formed between the inside surfaces 21b of the permanent magnets 21 and the inside wall surfaces 20b of the magnet housing apertures 20. Thus, because the cooling oil that flows through the cooling flow channels 23 contacts the inside surfaces 21b of the permanent magnets 21 directly, the permanent magnets 21 can be cooled effectively.

The adhesive 22 that fixes the permanent magnets 21 is applied only between the outside surfaces 21a of the permanent magnets 21 and the outside wall surfaces 20a of the magnet housing apertures 20. Thus, usage of the adhesive 22 is reduced, enabling costs to be reduced. Because the cross-sectional area of the magnet housing apertures 20 can be reduced in proportion to the reduction in the amount of adhesive 22, distances between the permanent magnets 21 and the inner wall surfaces of the magnet housing apertures 20 are shortened, suppressing increases in magnetoresistance between the permanent magnets 21 and the rotor core 17. Reductions in the amount of magnetic flux from the permanent magnets 21 that result from increases in magnetoresistance can thereby be suppressed.

Rotor grooves 24 are formed on the outer circumferential surface of the rotor core 17 so as to extend from the first axial end to the second axial end. Thus, cooling oil that leaks out to the outer circumferential side from between the core laminations that constitute the rotor core 17 is made to flow axially along the rotor grooves 24. Torque reductions due to cooling oil remaining in the air gap between the stator core 2 and the rotor core 17 can thereby be suppressed.

The first end plate 25 and the second end plate 29 are produced so as to have identical shapes. Thus, the first end plate 25 can also function as a second end plate 29, enabling the number of parts to be reduced.

The first end plate 25 includes first discharging channels 28 that communicate between an outer circumferential portion of the inlet flow channel 27 a second surface side of the first end plate 25. Thus, because a portion of the cooling oil that flows through the inlet flow channel 27 is discharged from the first discharging channels 28, and is sprayed onto the front-end coil ends of the stator coil 4 due to centrifugal force, temperature increases in the stator coil 4 can be suppressed.

The second end plate 29 includes second discharging channels 32 that communicate between an outer circumferential portion of the inlet flow channel 31 a second surface side of the second end plate 29. Thus, because the cooling oil that has flowed through the cooling flow channels 23 is discharged from the second discharging channels 32, and is sprayed onto the rear-end coil ends of the stator coil 4 due to centrifugal force, temperature increases in the stator coil 4 can be suppressed.

Control of the external oil pumping mechanism 35 by the controlling apparatus 40 will now be explained with reference to FIG. 4. Moreover, data for a correspondence table between the temperature detected by the temperature sensor 41 and the temperature of the permanent magnets 21, and a determining value that is set so as to allow for a safety factor relative to the temperature at which the permanent magnets 21 demagnetize thermally, for example, are stored in the controlling apparatus 40.

The controlling apparatus 40 first drives the external oil pumping mechanism 35 when the motor (embedded permanent magnet rotary electric machine 101) is activated (STEP 100). The cooling oil is thereby supplied to the cooling flow channels 23 through the in-shaft flow channel 33, the branching flow channels 34, and the inlet flow channel 27, and cooling of the permanent magnets 21 is performed.

Next, the controlling apparatus 40 determines whether or not the motor has stopped (STEP 101). If it is determined that the motor has stopped, the control apparatus 40 estimates the temperature of the permanent magnets 21 based on the temperature detected by the temperature sensor 41 and the stored data. Then, it is determined whether or not the estimated magnet temperature is less than or equal to a determining value (STEP 102). If it is determined at STEP 102 that the estimated magnet temperature is less than or equal to the determining value, it is deemed that the permanent magnets 21 have been cooled sufficiently, and driving of the external oil pumping mechanism 35 is stopped (STEP 103). Thus, the permanent magnets 21 are cooled by the cooling oil that remains in the cooling flow channels 23.

If it is determined at STEP 102 that the estimated magnet temperature has exceeded the determining value, it is deemed that the permanent magnets 21 have not been cooled sufficiently, and driving of the external oil pumping mechanism 35 is continued (STEP 104), while returning to STEP 102. Cooled cooling oil is thereby supplied to the cooling flow channels 23, and serves to cool the permanent magnets 21.

According to the driving control method of the external oil pumping mechanism 35 according to Embodiment 1, the temperature of the permanent magnets 21 is estimated based on the temperature detected by the temperature sensor 41 that is disposed in the stator core 2, it is determined whether or not the estimated magnet temperature is less than or equal to the determining value, and the driving of the external oil pumping mechanism 35 is stopped if the estimated magnet temperature is less than or equal to the determining value. Electric power consumption by the external oil pumping mechanism 35 can thereby be reduced. Because driving of the external oil pumping mechanism 35 is continued and cooled cooling oil is supplied to the cooling flow channels 23 if the estimated magnet temperature has exceeded the determining value, excessive temperature increases in the permanent magnets 21 are suppressed, enabling thermal demagnetization of the permanent magnets 21 to be prevented.

Moreover, in Embodiment 1 above, inlet flow channels 27 and 31 are formed by hollowing out first surfaces of the first end plate 25 and the second end plate 29 to a constant depth so as to leave outer circumferential edge portions thereof, but inlet flow channels may be configured such that eight flow channel grooves that are formed on first surfaces of a first end plate and a second end plate so as to each have groove directions oriented in a radial direction, and so as to extend from the shaft insertion apertures to a vicinity of the outer circumferential edges, are arranged at a uniform pitch in a circumferential direction. In that case, first discharging channels and second discharging channels should be formed so as to pass through the first end plate and the second end plate so as to communicate between an outer circumferential portion of each of the flow channel grooves and the second surface sides of the first end plate and the second end plate.

In Embodiment 1 above, the temperature sensor 41 is disposed on a core back portion 3a of the stator core 2, but the position of disposal of the temperature sensor 41 is not limited to the core back portion 3a, and may be any position at which the temperature of the permanent magnets 21 can be measured indirectly, such as the coil ends of the stator coil 4, for example.

Embodiment 2

Figure 5:
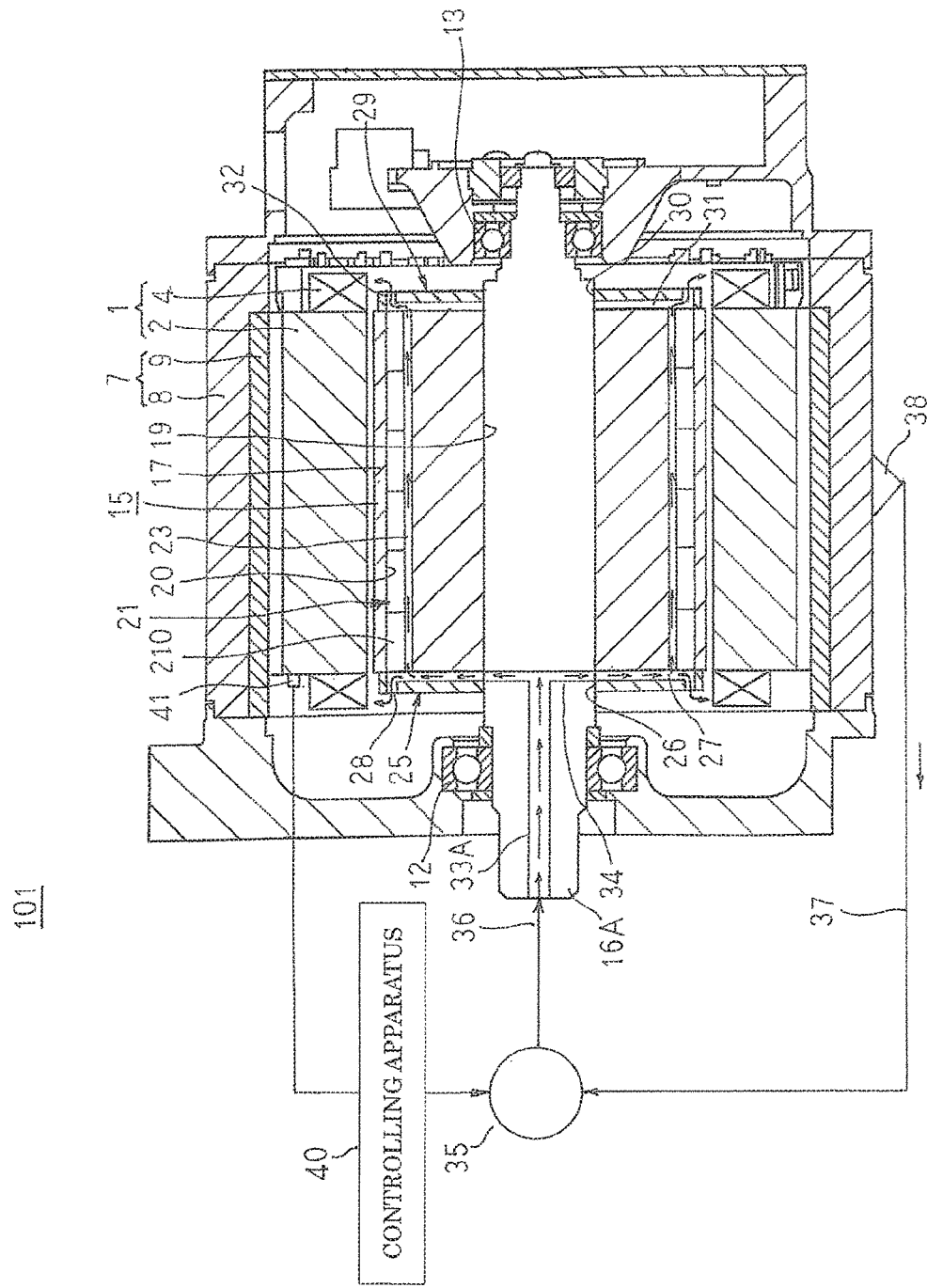
FIG. 5 is a cross section that shows an embedded permanent magnet rotary electric machine according to Embodiment 2 of the present invention.

FIG. 5 is a cross section that shows an embedded permanent magnet rotary electric machine according to Embodiment 2 of the present invention.

In FIG. 5, an in-shaft flow channel 33A is formed at a central axial position of a shaft 16A so as to extend from a first axial end to a position that is radially below an inlet flow channel 27 that is formed on a first end plate 25. Branching flow channels 34 are formed in the shaft 16A so as to communicate between a second axial end of the in-shaft flow channel 33A and the inlet flow channel 27.

Moreover, the rest of the configuration is formed in a similar or identical manner to that of Embodiment 1 above.

In an embedded permanent magnet rotary electric machine 101 that is configured in this manner, because the in-shaft flow channel 33A is formed only on the front end of the shaft 16A, costs for the shaft 16A can be reduced.

Embodiment 3

Figure 6:
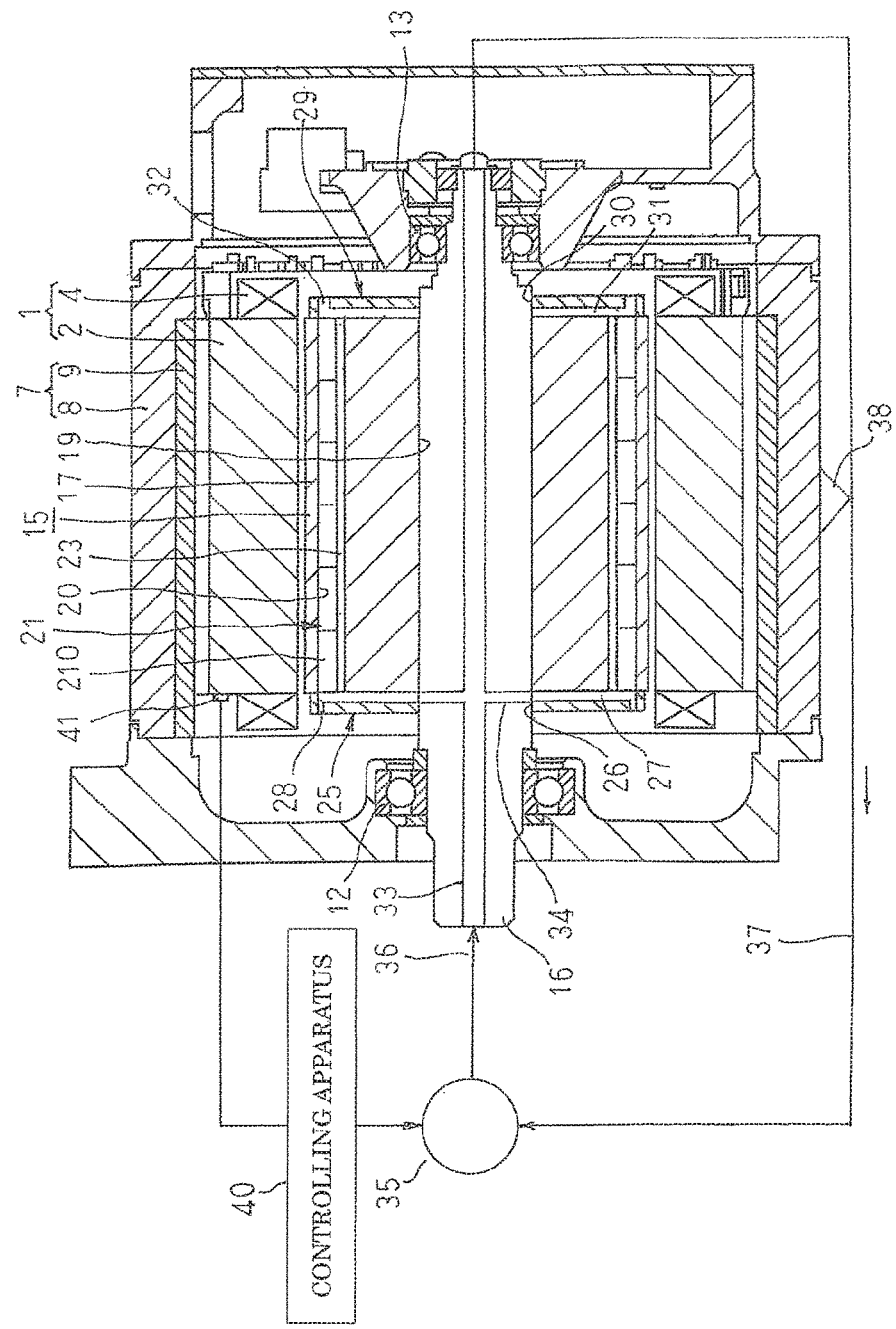
FIG. 6 is a cross section that shows an embedded permanent magnet rotary electric machine according to Embodiment 3 of the present invention.

FIG. 6 is a cross section that shows an embedded permanent magnet rotary electric machine according to Embodiment 3 of the present invention.

In FIG. 6, flow channel cross-sectional area of first discharging channels 28, cooling flow channels 23, and second discharging channels 32 is increased in order of the first discharging channels 28, the cooling flow channels 23, and the second discharging channels 32.

Moreover, the rest of the configuration is formed in a similar or identical manner to that of Embodiment 1 above.

In an embedded permanent magnet rotary electric machine 102 that is configured in this manner, because the flow channel cross-sectional area of the first discharging channels 28 is less than the flow channel cross-sectional area of the cooling flow channels 23, the outflow rate from the first discharging channels 28 of the cooling oil that has flowed in through the inlet flow channels 27 is limited. The amount of cooling oil that is supplied to the cooling flow channels 23 is thereby sufficiently ensured, preventing cooling of the permanent magnets 21 from deteriorating.

Because the flow channel cross-sectional area of the second discharging channels 32 is greater than the flow channel cross-sectional area of the cooling flow channels 23, the cooling oil that has flowed in through the cooling flow channels 23 flows out through the second discharging channels 32 more easily. Flow velocity of the cooling oil that flows through the cooling flow channels 23 is thereby increased, improving cooling performance for the permanent magnets 21.

Embodiment 4

Figure 7:
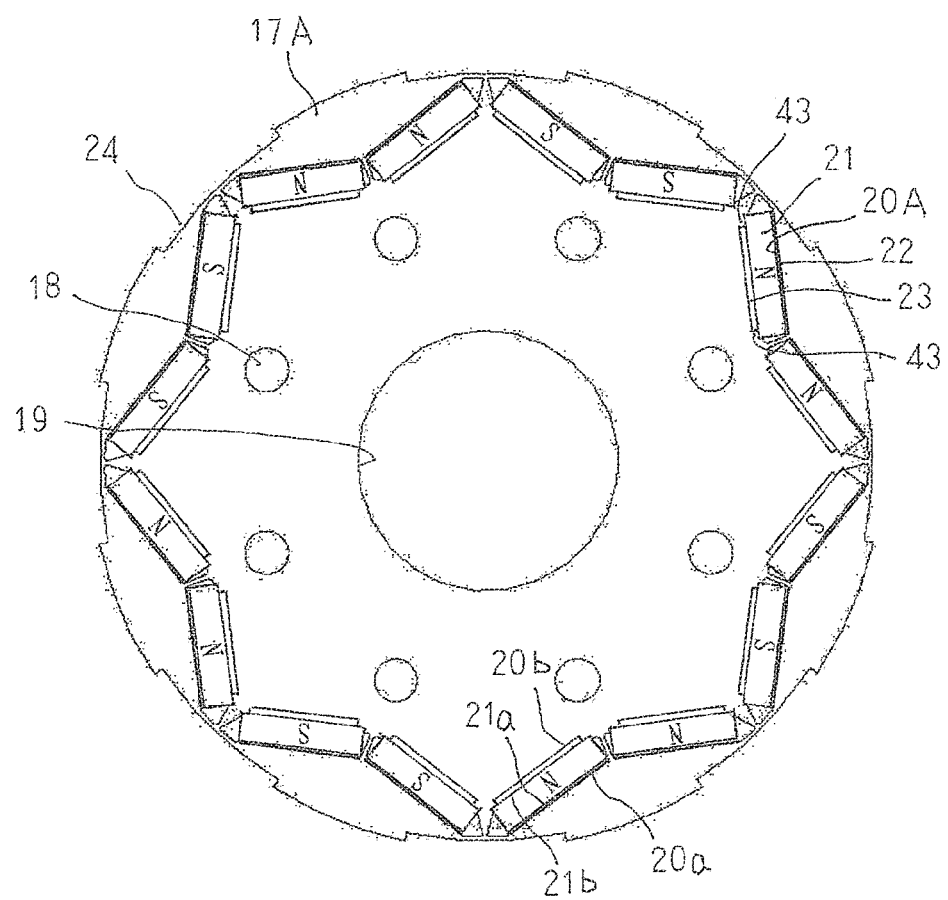
FIG. 7 is an end elevation that shows a rotor core in an embedded permanent magnet rotary electric machine according to Embodiment 4 of the present invention.

FIG. 7 is an end elevation that shows a rotor core in an embedded permanent magnet rotary electric machine according to Embodiment 4 of the present invention.

In FIG. 7, magnet housing apertures 20A are formed on a rotor core 17A such that two width direction ends of inside wall surfaces 20b thereof protrude radially outward. The protruding portions of the two width direction ends of the inside wall surfaces 20b of the magnet housing apertures 20A constitute supporting portions 43.

Moreover, the rest of the configuration is formed in a similar or identical manner to that of Embodiment 1 above.

In a rotor 15A that uses a rotor core 17A that is configured in this manner, two width direction ends of the inside surfaces 21b of the permanent magnets 21 that are housed inside the magnet housing apertures 20A are supported by the supporting portions 43. Thus, because the layers of adhesive 22 that glue together the outside surfaces 21a of the permanent magnets 21 and the outside wall surfaces 20a of the magnet housing apertures 20A can be made thinner, the cross-sectional area of the magnet housing apertures 20A can be reduced in proportion to the reductions in the layers of adhesive 22, suppressing reductions in the amount of magnetic flux from the permanent magnets 21.

Embodiment 5

Figure 8:
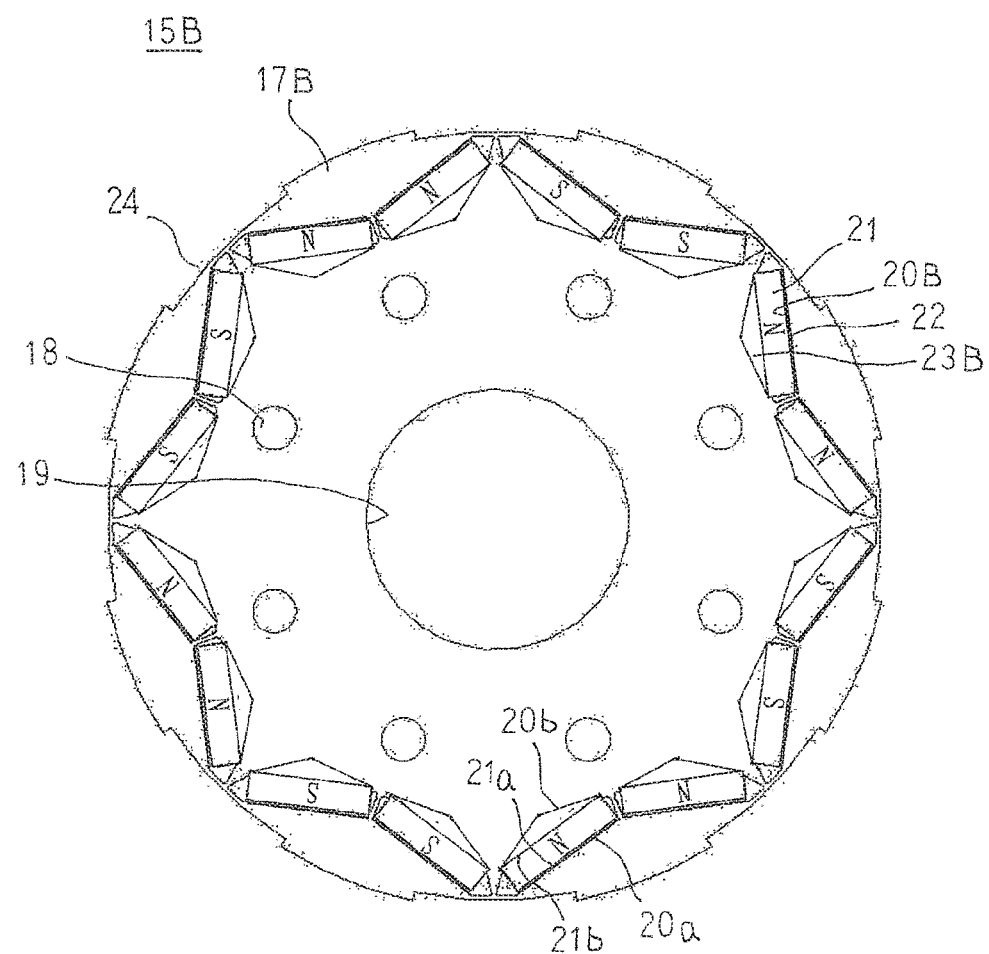
FIG. 8 is an end elevation that shows a rotor core in an embedded permanent magnet rotary electric machine according to Embodiment 5 of the present invention.
Figure 9:
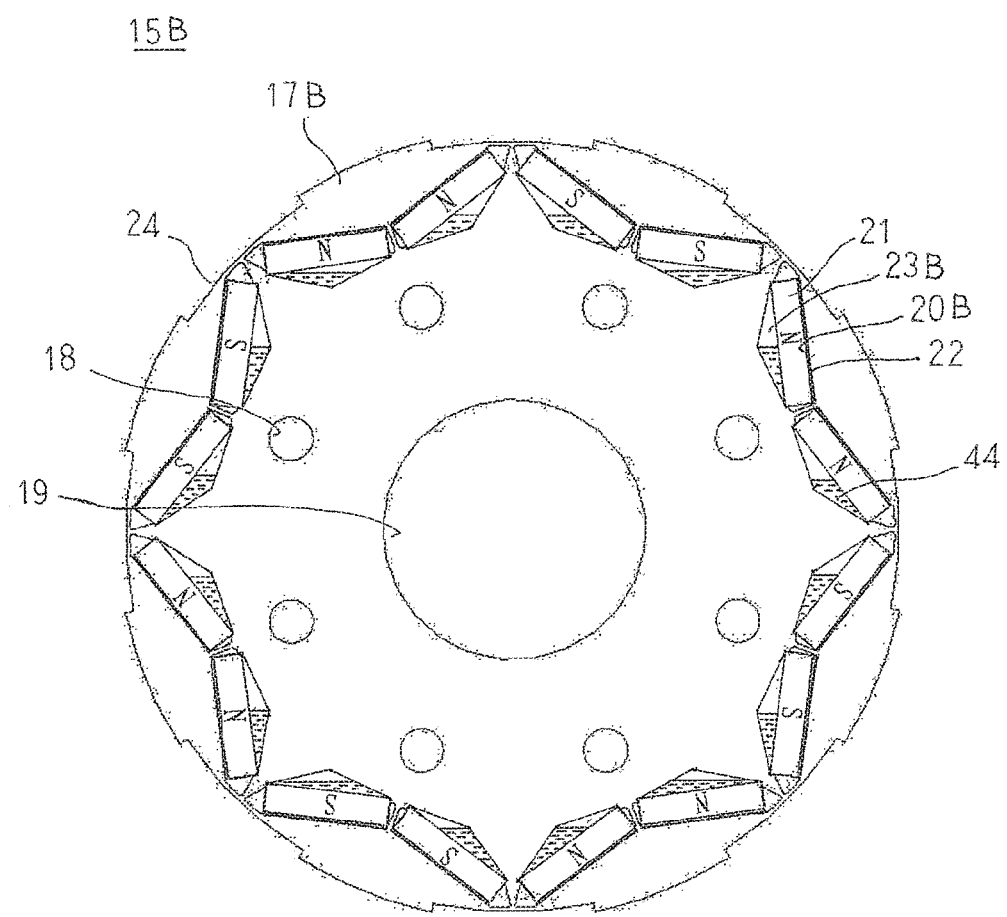
FIG. 9 is an end elevation that shows a state of the rotor core in the embedded permanent magnet rotary electric machine according to Embodiment 5 of the present invention when a motor is stopped.

FIG. 8 is an end elevation that shows a rotor core in an embedded permanent magnet rotary electric machine according to Embodiment 5 of the present invention, and FIG. 9 is an end elevation that shows a state of the rotor core in the embedded permanent magnet rotary electric machine according to Embodiment 5 of the present invention when a motor is stopped.

In FIG. 8, magnet housing apertures 20B are formed on a rotor core 17B in a V shape in which a width of inside wall surfaces 20b thereof gradually becomes narrower in a radially inward direction. Cooling flow channels 23B are formed thereby so as to have triangular flow channel cross sections.

Moreover, the rest of the configuration is formed in a similar or identical manner to that of Embodiment 1 above.

In a rotor 15B that uses a rotor core 17B that is configured in this manner, cooling flow channels 23B are formed so as to have triangular flow channel cross sections. Thus, because cooling performance that is equal to that of the cooling flow channels 23 can be obtained even if the pressure of the cooling oil is reduced below the pressure of cooling oil that is supplied to cooling flow channels 23 that are formed so as to have oblong flow channel cross sections, electric power consumption of the external oil pumping mechanism 35 can be reduced.

Furthermore, if the driving of the motor is stopped, the contact area between the permanent magnets 21 and the cooling oil 44 that remains in the cooling flow channels 23B is increased, as shown in FIG. 9. Consequently, when the motor is stopped, the permanent magnets 21 can be cooled effectively by the cooling oil 44 that remains in the cooling flow channels 23B.

Moreover, in each of the above embodiments, cases in which a rotary electric machine has been applied to an electric motor have been explained, but similar or identical effects are also exhibited if the rotary electric machine is applied to a generator.

In each of the above embodiments, an eight-pole, twelve-slot rotary electric machine has been explained, but it goes without saying that the number of poles and the number of slots are not limited to eight poles and twelve slots.

In each of the above embodiments, pairs of permanent magnets that constitute magnetic poles are disposed in V shapes that open radially outward from a shaft, but arrangement of the permanent magnets is not limited thereto. For example, the respective permanent magnets may also be disposed at a uniform angular pitch circumferentially such that the permanent magnets contact an identical cylindrical surface to constitute magnetic poles.

In each of the above embodiments, the permanent magnets are divided into six magnet blocks in an axial direction, but the permanent magnets may be configured into an integrated body in which six magnet blocks are joined together.

In each of the above embodiments, the permanent magnets are produced so as to have a cross section perpendicular to an axial direction of a shaft that is a rectangular shape, but the cross section of the permanent magnets is not limited to a rectangular shape, and may be a circular arc shape that is curved into a circular arc, for example. In that case, the magnet housing apertures are formed so as to have a cross-sectional shape that conforms to the cross-sectional shape of the permanent magnets.

The invention claimed is:

1. An embedded permanent magnet rotary electric machine comprising:
    a stator comprising:
    an annular stator core; and
    a stator coil that is wound onto said stator core; and
    a rotor comprising:
    a rotor core that is configured by laminating and integrating electromagnetic steel sheets, and that is fixed to a shaft so as to be disposed rotatably inside said stator core;
    a plurality of permanent magnet housing apertures that are disposed circumferentially so as to be respectively formed so as to pass axially through an outer circumferential side of said rotor core; and
    permanent magnets that are housed in each of said magnet housing apertures,
    cooling flow channels through which a coolant flows are formed by an inside surface that is positioned on a radially inner side of said surface of said permanent magnets and inside wall surfaces that are positioned on a radially inner side of said inner wall surface of said magnet housing apertures;
    a first end plate that is fixed to said shaft, and that is disposed such that a first surface thereof contacts a first axial end surface of said rotor core, wherein:
        an in-shaft flow channel is formed at a central axial position of said shaft so as to extend axially,
        a branching flow channel is formed on said shaft so as to branch off radially from said in-shaft flow channel and extend to an outer circumferential surface of said shaft,
        an inlet flow channel is formed on said first surface of said first end plate so as to communicate between said branching flow channel and said cooling flow channels, and
        a first discharging channel is formed on said first end plate so as to communicate between an outer circumferential portion of said inlet flow channel and a second surface side of said first end plate;
    a second end plate that is fixed to said shaft, and that is disposed such that a first surface thereof contacts a second axial end surface of said rotor core, wherein:
        a second discharging channel is formed on said second end plate so as to communicate between said cooling flow channels and a second surface side of said second end plate; and
    an adhesive is disposed only between an outside wall surface that is positioned on a radially outer side of an inner wall surface of said magnet housing apertures and an outside surface that is positioned on a radially outer side of a surface of said permanent magnets such that said permanent magnets are fixed so as to be closer to said outside wall surface of said magnet housing apertures
    wherein:
    a flow channel cross-sectional area of said first discharging channel is less than a flow channel cross-sectional area of said cooling flow channels, and;
    a flow channel cross-sectional area of said second discharging channel is greater than said flow channel cross-sectional area of said cooling flow channels.

2. The embedded permanent magnet rotary electric machine according to claim 1, wherein said in-shaft flow channel is formed only in an axial region from a first axial end of said shaft to a position at which said first end plate is fixed.

3. The embedded permanent magnet rotary electric machine according to claim 1, wherein said magnet housing apertures comprise supporting portions that project from two width direction end portions of said inside wall surface of said magnet housing apertures so as to support two width direction end portions of said inside surface of said permanent magnets.

4. The embedded permanent magnet rotary electric machine according to claim 1, wherein said inside wall surface of said magnet housing apertures is formed so as to have a shape in which a width thereof becomes narrower radially inward such that a cross-sectional shape of said cooling flow channels perpendicular to an axial direction of said shaft is configured into a triangular shape.

5. The embedded permanent magnet rotary electric machine according to claim 1, wherein a plurality of rotor grooves are disposed circumferentially so as to be respectively formed on an outer circumferential surface of said rotor core so as to have groove directions in an axial direction so as to extend from a first axial end to a second axial end.

6. The embedded permanent magnet rotary electric machine according to claim 1, further comprising:
    a coolant supplying apparatus that supplies said coolant to said cooling flow channels;
    a temperature sensor that detects a temperature of said permanent magnets indirectly; and
    a controlling apparatus that controls driving of said coolant supplying apparatus,
    said controlling apparatus being configured such that said temperature of said permanent magnets is estimated based on a temperature detected by said temperature sensor, and driving of said coolant supplying apparatus is stopped if an estimated temperature of said permanent magnets is less than or equal to a determining value, and driving of said coolant supplying apparatus is continued if said estimated temperature is greater than said determining value.

* * * * *